US008804146B2

(12) United States Patent
Sasaki et al.

(10) Patent No.: US 8,804,146 B2
(45) Date of Patent: Aug. 12, 2014

(54) DEVICE, CONTROL DEVICE, CONTROL SYSTEM, AND NON-TRANSITORY COMPUTER READABLE MEDIUM

(75) Inventors: Hirotaka Sasaki, Kanagawa (JP); Masafumi Ono, Kanagawa (JP); Yasushi Amano, Kanagawa (JP); Hideharu Sakakibara, Kanagawa (JP); Yasuhiro Endoh, Kanagawa (JP); Takafumi Kumazaki, Kanagawa (JP); Takahisa Koga, Kanagawa (JP); Hiroshi Mikuriya, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 141 days.

(21) Appl. No.: 13/450,048

(22) Filed: Apr. 18, 2012

(65) Prior Publication Data

US 2013/0163015 A1 Jun. 27, 2013

(30) Foreign Application Priority Data

Dec. 22, 2011 (JP) ................................ 2011-282362

(51) Int. Cl.
*G06F 15/00* (2006.01)

(52) U.S. Cl.
USPC ........................................................ 358/1.13

(58) Field of Classification Search
USPC ........................................................ 358/1.13
See application file for complete search history.

(56) References Cited

U.S. PATENT DOCUMENTS

2007/0206211 A1* 9/2007 Okutsu et al. ................ 358/1.14

FOREIGN PATENT DOCUMENTS

JP A-2007-268959 10/2007

* cited by examiner

*Primary Examiner* — Saeid Ebrahimi Dehkordy
(74) *Attorney, Agent, or Firm* — Oliff PLC

(57) ABSTRACT

A device includes a first receiving unit that receives a supply voltage supplied from a control device, a second receiving unit that receives from the control device a control signal for executing a predetermined operation in each functional unit, a setting unit that sets the predetermined operation in a setting section when the second receiving unit receives the control signal indicating the predetermined operation to be executed in each functional unit when the supply voltage is in an OFF state, and a controller that performs control to execute the predetermined operation, which is set in the setting unit, in each functional unit when the supply voltage received by the first receiving unit is in an OFF state.

7 Claims, 10 Drawing Sheets

FIG. 5

| OPERATION CHANGE COMMAND | SETTING OPERATION |
|---|---|
| ×××× | OPERATION IS STOPPED IF VBUS OFF IS DETECTED |
| ○○○○ | OPERATION CONTINUES EVEN IF VBUS OFF IS DETECTED |
| ××○○ | POWER SAVING MODE IF VBUS OFF IS DETECTED |
| ○○×× | TIMER SETTING IF VBUS OFF IS DETECTED |

(FIG. 6 Continued)
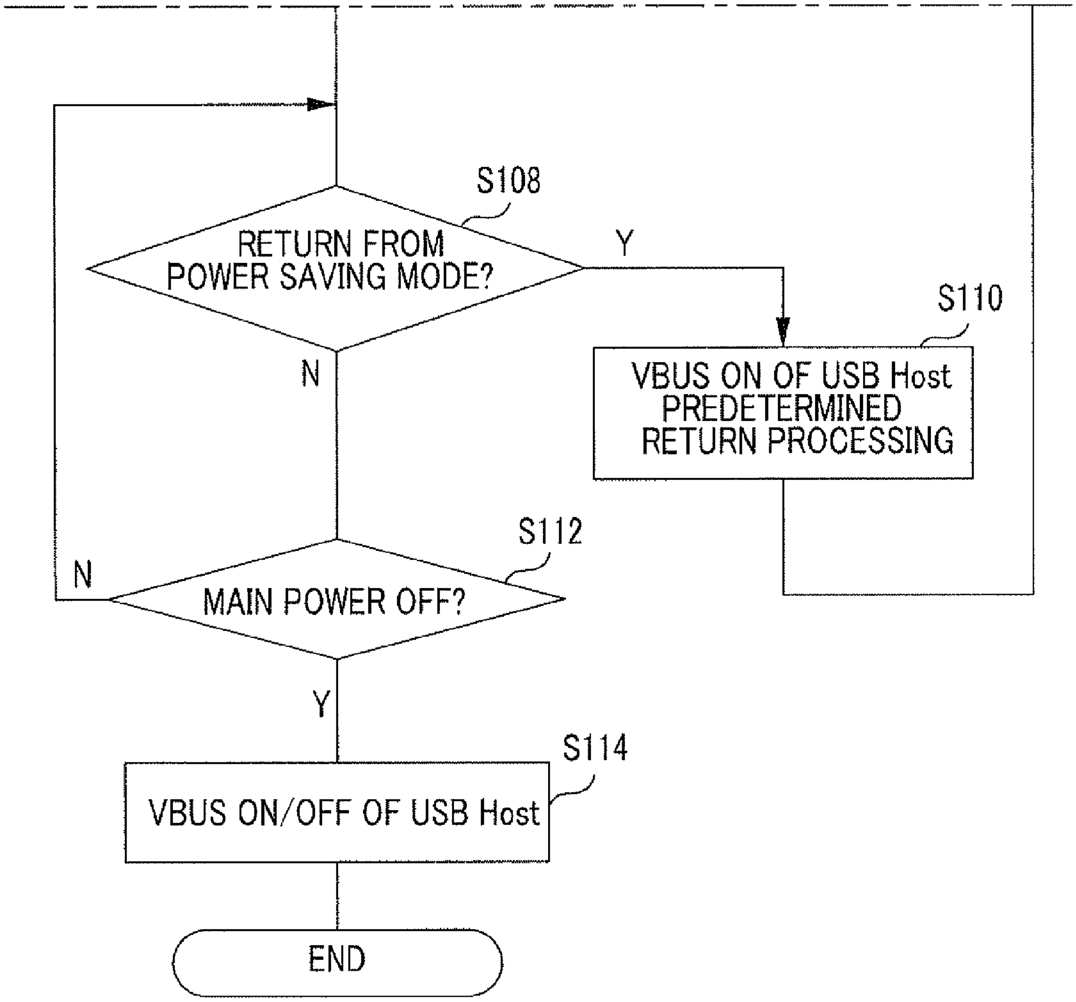

(FIG. 7 Continued)
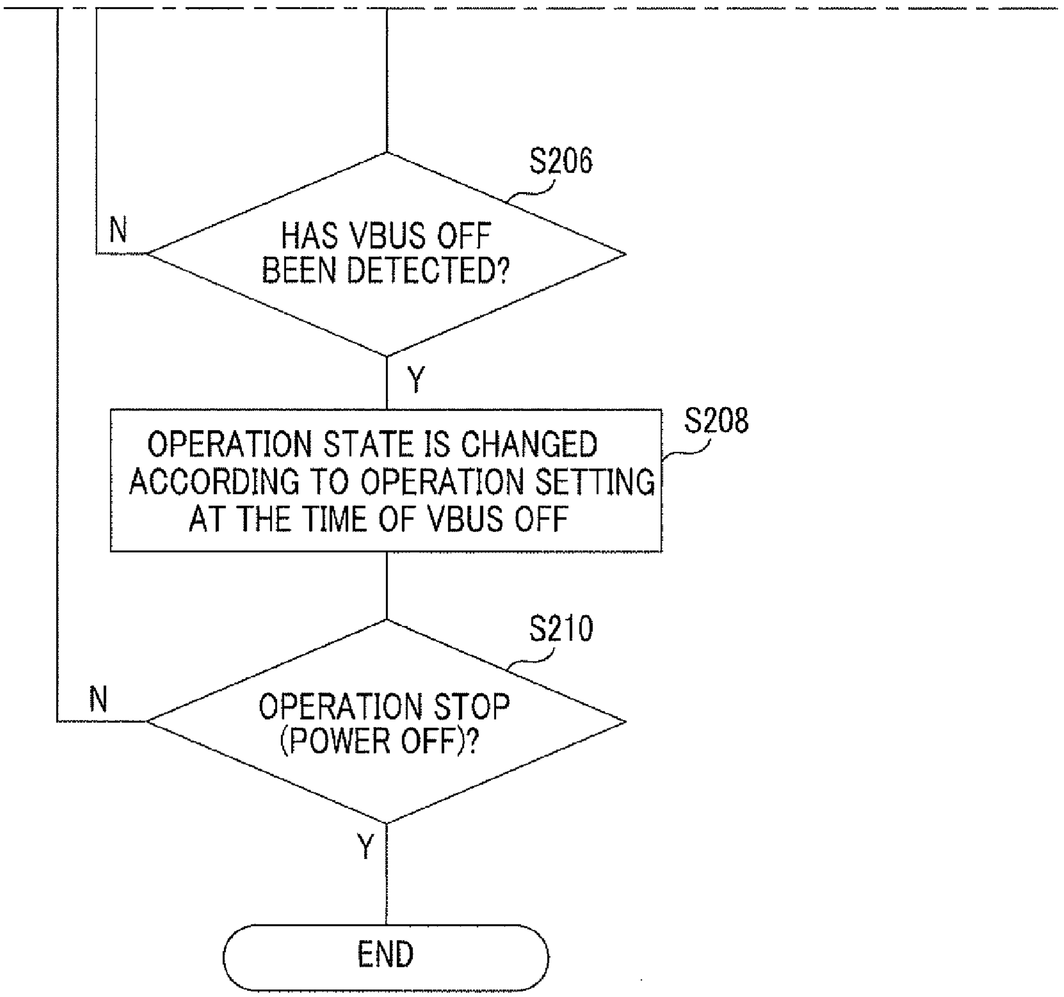

DEVICE, CONTROL DEVICE, CONTROL SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2011-282362 filed Dec. 22, 2011.

BACKGROUND

Technical Field

The present invention relates to a device, a control device, a control system, and a non-transitory computer readable medium.

SUMMARY

According to an aspect of the invention, there is provided a device including: a first receiving unit that receives a supply voltage supplied from a control device; a second receiving unit that receives from the control device a control signal for executing a predetermined operation in each functional unit; a setting unit that sets the predetermined operation in a setting section when the second receiving unit receives the control signal indicating the predetermined operation to be executed in each functional unit when the supply voltage is in an OFF state; and a controller that performs control to execute the predetermined operation, which is set in the setting unit, in each functional unit when the supply voltage received by the first receiving unit is in an OFF state.

BRIEF DESCRIPTION OF THE DRAWINGS

Exemplary embodiments of the present invention will be described in detail based on the following figures, wherein:

FIG. 5 is a table showing a specific example of the relationship between a control signal (control command) and an operation of an air cleaner;

DETAILED DESCRIPTION

Hereinafter, an exemplary embodiment of the invention will be described in detail with reference to the accompanying drawings. In the present exemplary embodiment, as specific examples, cases will be described in detail in which a control device according to the exemplary embodiment of the invention is applied as a control device of a multifunctional machine (which will be described in detail later) including a document reader, an image forming apparatus, or the like, a device of the invention is applied as an air cleaner (which will be described in detail later), and the control device and the device are applied to a control system 1 including a multifunctional machine and an air cleaner.

Figure 1A:
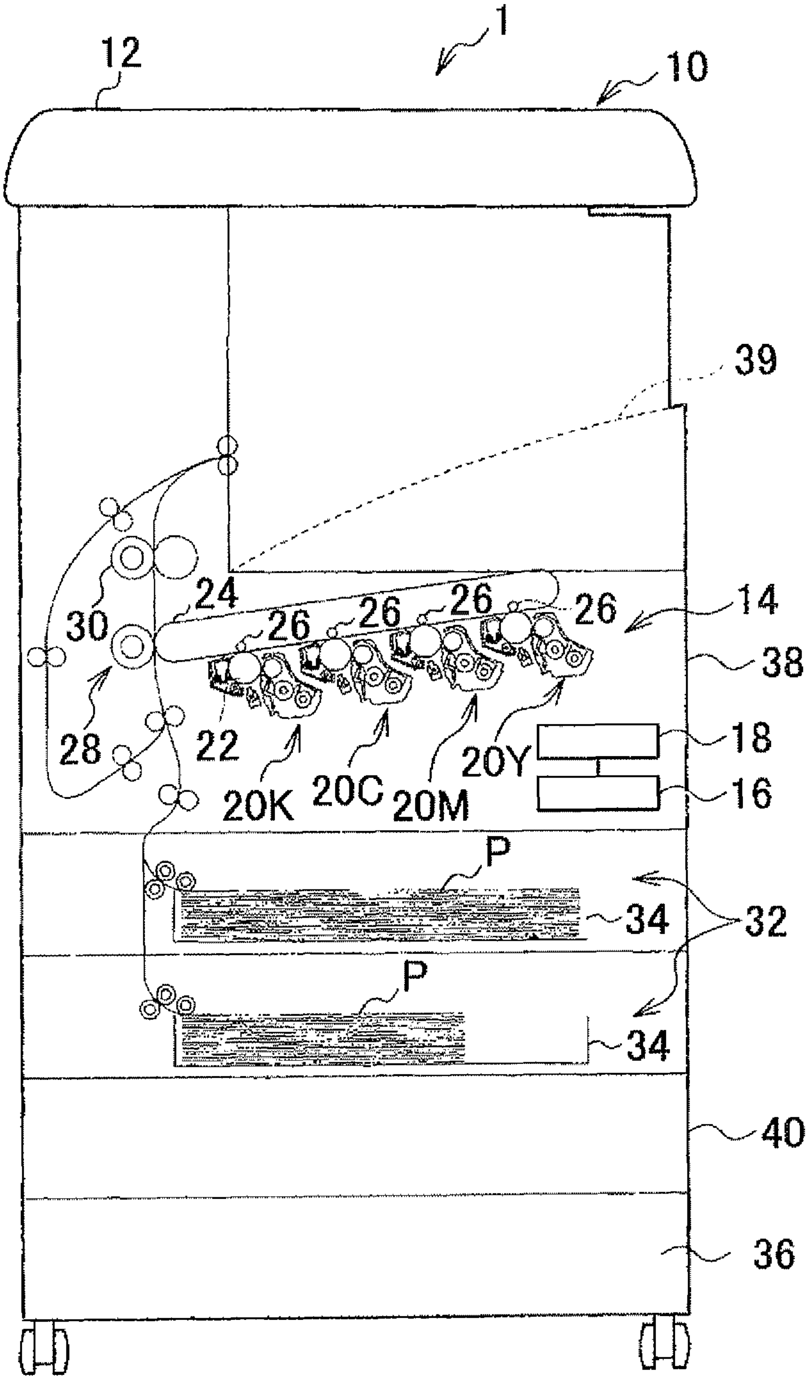
FIGS. 1A and 1B are schematic configuration diagrams showing the entire configuration of an example of a multifunctional machine according to an exemplary embodiment.
Figure 1B:
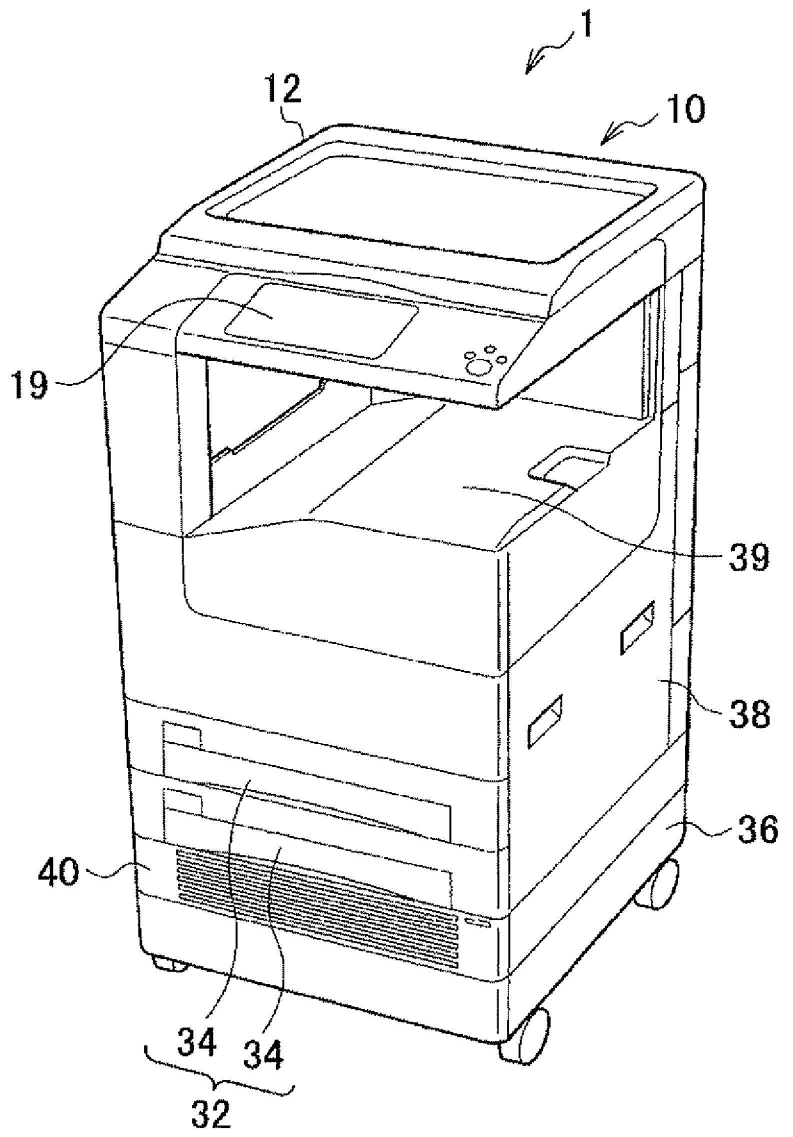
Figure 2:
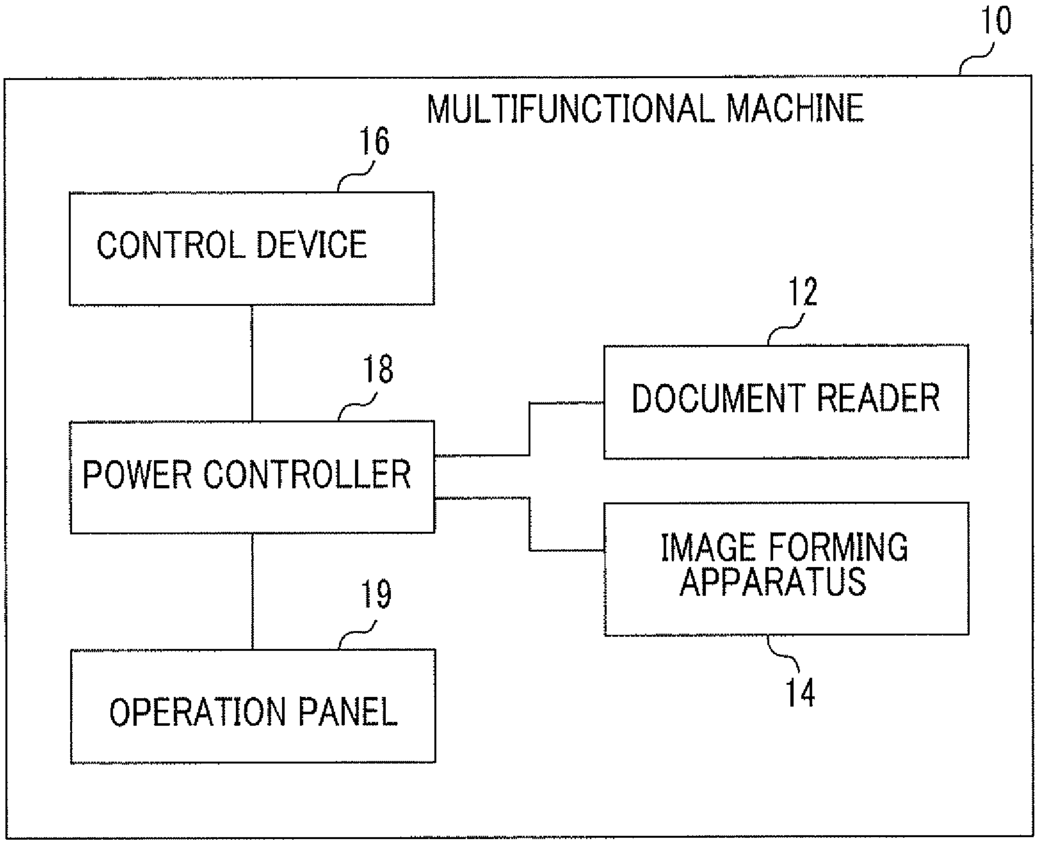
FIG. 2 is a block diagram showing the schematic configuration of each device provided in the multifunctional machine according to the exemplary embodiment.

First, the outline of the multifunctional machine according to the present exemplary embodiment will be described with reference to FIGS. 1A, 1B, and 2. FIGS. 1A and 1B show the outline of an example of the multifunctional machine according to the present exemplary embodiment. FIG. 1A is a schematic configuration diagram of a multifunctional machine 10, and FIG. 1B is a perspective view schematically showing the appearance of the multifunctional machine 10. FIG. 2 is a block diagram showing the schematic configuration of each device provided in the multifunctional machine 10 according to the present exemplary embodiment.

The multifunctional machine 10 according to the present exemplary embodiment shown in FIGS. 1A and 1B is a multifunctional machine having a document reading function, a copy function, a print function, and the like. The multifunctional machine 10 is configured to include a document reader 12 that is a scanner that reads a document or the like, an image forming apparatus 14, and a control device 16 for performing overall control of the multifunctional machine 10. In addition, the multifunctional machine 10 according to the present exemplary embodiment includes a paper feed unit 32 in which paper P is housed. In addition, the multifunctional machine 10 according to the present exemplary embodiment includes an operation panel 19 as a so-called user interface having a function of displaying (notifying) a state of the multifunctional machine 10 or the like for a user and a function of receiving various kinds of instructions from the user. Moreover, in the present exemplary embodiment, an air cleaner 40 is formed integrally with the multifunctional machine 10.

Each member including the image forming apparatus 14 of the multifunctional machine 10 according to the present exemplary embodiment is accommodated inside a housing 38 that is detachably stacked on a base 36. A paper discharge unit 39 is provided in an upper portion of the housing 38, the upper portion being located below the document reader 12 of the multifunctional machine 10. The paper discharge unit 39 is configured to discharge the paper P on which an image is formed by the image forming apparatus 14.

An image forming unit 20 (20Y, 20M, 20C, and 20K) for each color (in the present exemplary embodiment, four colors), which is disposed in parallel at fixed distances, is provided in the multifunctional machine 10. Each image forming unit 20 includes a photoconductor 22 that forms an electrostatic latent image to hold a toner image, and forms a toner image on an intermediate transfer body 24 by a so-called electrophotographic method. In addition, the image forming units 20Y, 20M, 20C, and 20K have the same configuration except that toner corresponding to the color of a toner image to be formed is stored in a developing unit in order to form toner images of yellow (Y), magenta (M), cyan (C), and black (K) Hereinafter, the image forming units 20Y, 20M, 20C, and 20K are called the "image forming unit 20" when collectively called without distinction, and reference numerals of "Y", "M", "C", and "K" are attached in order to distinguish them from each other.

In addition, the image forming apparatus 14 includes the intermediate transfer body 24, a primary transfer unit 26, a secondary transfer unit 28, and a fixing unit 30. The primary transfer unit 26 has a function of transferring (primary transfer) each color toner image, which is formed by the image forming unit 20, sequentially onto the intermediate transfer body 24. The secondary transfer unit 28 has a function of collectively transferring (secondary transfer) respective color toner images, which are formed on the intermediate transfer body 24 so as to overlap each other, onto a recording material (paper P). In addition, the fixing unit 30 has a function of fixing each color toner image transferred by secondary transfer to the paper P.

The paper feed unit 32 includes a paper accommodation section 34 that accommodates the paper P. The paper feed unit has a function of supplying the paper P, which is accommodated in the paper accommodation section 34, to the secondary transfer unit 28 when an image is formed by the image forming apparatus 14.

In addition, the multifunctional machine 10 according to the present exemplary embodiment includes a power controller 18, as shown in FIG. 2. The power controller 18 has a function of controlling a power supply voltage (electric power) supplied to each device (the document reader 12, the image forming apparatus 14, the control device 16, and the operation panel 19) provided in the multifunctional machine 10 or to a functional unit of each device. For example, when main power is supplied to the multifunctional machine 10, the power controller 18 supplies a power supply voltage (electric power) to each device (the document reader 12, the image forming apparatus 14, the control device 16, and the operation panel 19). In addition, the multifunctional machine 10 according to the present exemplary embodiment has a power saving mode (so-called sleep mode or energy saving mode) in which the supply of electric power to some or all devices or the supply of electric power to some or all functional units provided in each device is stopped while main power is being supplied in order to suppress power consumption compared with a normal operating state. Therefore, the power controller 18 is configured to stop the supply of a power supply voltage (electric power) to each device (or each functional unit) set in advance according to predetermined conditions (for example, when a predetermined time elapses after the document reader 12 and the image forming apparatus 14 have stopped working).

An example of an image forming operation of the multifunctional machine 10 will be described. When forming an image according to the document read by the document reader 12, the document reader 12 outputs to the image forming apparatus 14 the image data obtained by reading the document. In addition, when forming an image according to the image data input from an external apparatus (refer to FIG. 3), such as a personal computer, the image data is input from the external apparatus. The image data is transmitted to each image forming unit 20 after predetermined image processing is performed. In each image forming unit 20, the photoconductor 22 is electrically charged to a predetermined electric potential while rotating and is then scanned and exposed. Then, an electrostatic latent image corresponding to each color image is formed on the photoconductor 22. The electrostatic latent image formed on the photoconductor 22 is developed, so that each color toner image is formed on the photoconductor 22.

Each color toner image formed by each image forming unit is electrostatically attracted onto the intermediate transfer body 24, which is driven to rotate, sequentially by the primary transfer unit 26. Then, a toner image obtained by overlapping of each color toner image is formed on the intermediate transfer body 24. In addition, the overlapped toner image on the intermediate transfer body 24 is transported to the secondary transfer unit 28 with movement of the intermediate transfer body 24 and is electrostatically transferred collectively onto the paper P, which is supplied to the secondary transfer unit 28 by the paper feed unit 32, by the operation of the transfer electric field formed by the secondary transfer unit 28.

Then, the paper P on which the toner image has been electrostatically transferred is separated from the intermediate transfer body 24 and is transported up to the fixing unit 30. The toner image on the paper P transported to the fixing unit 30 is fixed on the paper P by fixing processing using heat and pressure in the fixing unit 30 and is then discharged through the paper discharge unit 39.

In addition, the air cleaner 40 according to the present exemplary embodiment has a function of cleaning (filtering) the air (air discharged from the image forming apparatus 14 and the like), and executes a predetermined operation to clean (filter) the air according to an instruction from the control device 16.

The air cleaner 40 includes various air cleaning members (not shown) for cleaning (filtering) the air. The air cleaning member is not particularly limited, but examples include various filters, such as a prefilter for removing dust or foreign substances from the air, a deodorization filter, and a bio-filter for removal of viruses and the like, and an air blower (fan).

Figure 3:
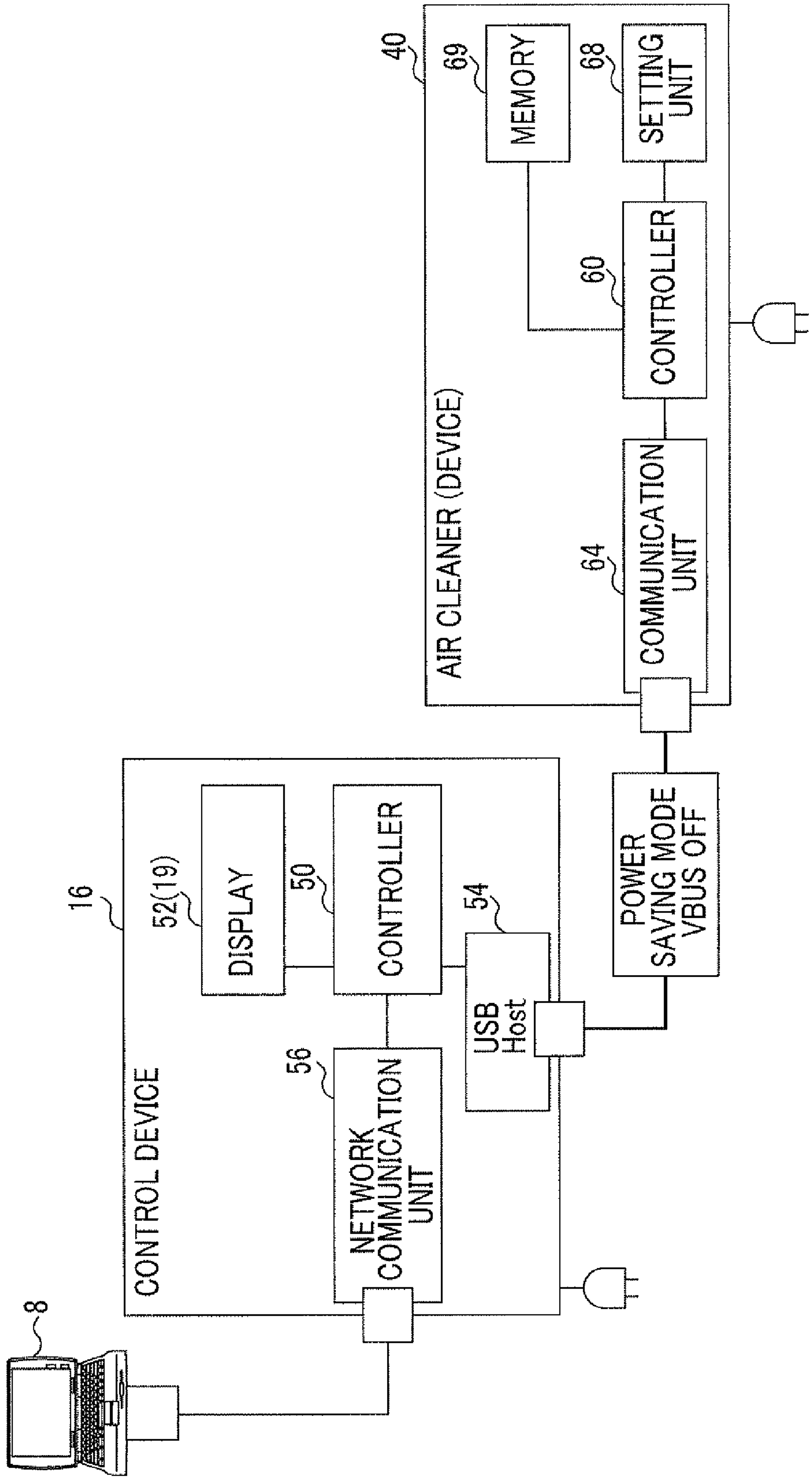
FIG. 3 is a functional block diagram showing an example of the schematic configuration of a control device and an air cleaner according to the exemplary embodiment.

FIG. 3 is a functional block diagram showing an example of the configuration of the control device 16 and the air cleaner 40 according to the present exemplary embodiment.

The control device 16 according to the present exemplary embodiment includes a controller 50, a display 52, a USB Host 54, and a network communication unit 56.

The controller 50 has a function of performing overall control of the control device 16. In addition, in the present exemplary embodiment, the controller 50 has a function of controlling the operation of the air cleaner 40 (which will be described in detail later) through the USB Host 54.

Figure 4:
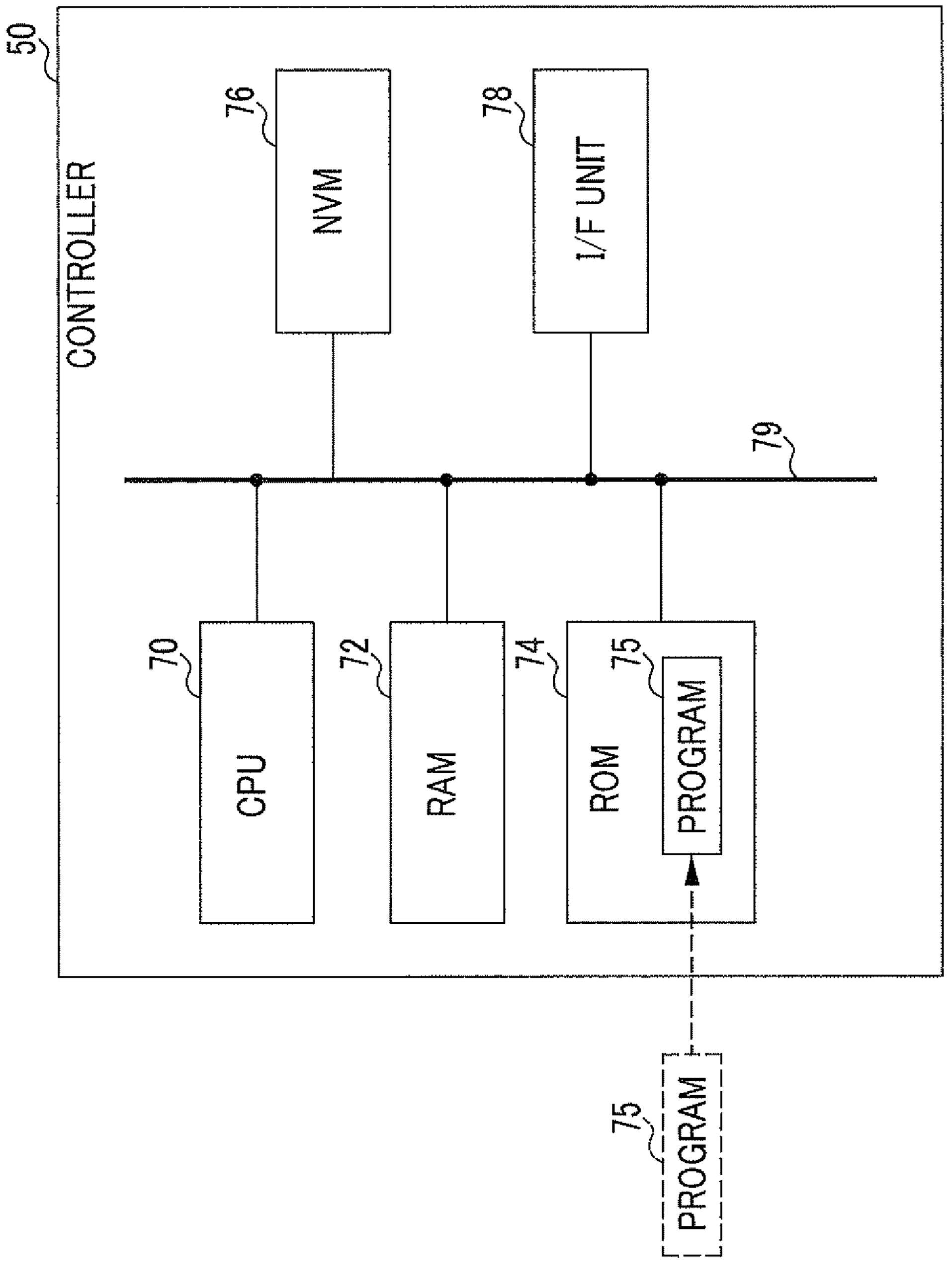
FIG. 4 is a schematic configuration diagram showing an example of the hardware configuration of a controller of the control device according to the exemplary embodiment.

FIG. 4 is a schematic configuration diagram showing an example of the hardware configuration of the controller 50 according to the present exemplary embodiment. The controller 50 according to the present exemplary embodiment includes a CPU 70, a RAM 72, a ROM 74, an NVM (Non Volatile Memory) 76, and an I/F unit 78. The CPU 70, the RAM 72, the ROM 74, the NVM 76, and the I/F (interface) unit 78 are connected to each other through a bus 79, such as a control bus or a data bus, so that transmission and reception of information and the like therebetween may be performed.

The CPU 70 has a function of executing digital arithmetic processing according to a control program 75 set in advance. The RAM 72 is intended to ensure the work area when the CPU 70 executes the control program 75. Various setting values used in processing of the CPU 70, the control program 75 for control processing or the like (which will be described in detail later), and the like are stored in the ROM 74. In the present exemplary embodiment, when the control program 75 is executed by the CPU 70, control processing, which will be described in detail later, is performed. The NVM 76 is a flash memory or the like that holds data even if the supply of electric power from the power controller 18 is stopped and that is backed up by battery. In addition, the I/F unit 78 controls input and output of a signal to and from each unit of the control device 16 connected to the controller 50.

In addition, although the control program 75 is stored in advance in the present exemplary embodiment, the control program 75 may be installed in the ROM 74 from an external apparatus (not shown) without being limited to this. In addition, the program may be transmitted to the controller 50 through a network, such as the Internet, so that it is installed in the ROM 74 of the controller 50. In addition, the program may be installed in the ROM 74 from external recording media, such as a DVD-ROM, a flash memory, or a USB.

The display 52 has a function of displaying a control state of the control device 16 (controller 50) and a state (operating state or the like) of the air cleaner 40 for the user. In addition, in the present exemplary embodiment, the display 52 has a function of receiving instructions regarding the operation of the air cleaner 40 from the user, instructions regarding each control, and the like. In addition, in the present exemplary embodiment, the operation panel 19 is used as the display 52.

The network communication unit 56 has a function of communicating various kinds of data (including image data) with a personal computer 8. In the present exemplary embodiment, the control device 16 (network communication unit 56) and the personal computer 8 are connected to each other by network lines, such as a LAN (Local Area Network), a WAN (Wide Area Network), and the Internet. However, the invention is not limited to this.

In the present exemplary embodiment, the control device 16 and the air cleaner 40 are connected to each other by a USB line, and the USB Host 54 has a function for USB communication with the air cleaner 40 (communication unit 64 of the air cleaner 40).

Under the control of the controller 50, the USB Host 54 supplies a supply voltage (start-up voltage of the air cleaner 40; hereinafter, referred to as VBUS) to the air cleaner 40 through a USB VBUS line and also transmits a control signal (control command) for controlling the operation of the air cleaner 40 through a signal line.

In the present exemplary embodiment, the control device 16 stops the supply of a power supply voltage (electric power) to the display 52, the USB Host 54, and the network communication unit 56 when the multifunctional machine 10 is in the power saving mode. In addition, there is no particular limitation regarding which functions are stopped. In the present exemplary embodiment, at least the function of the USB Host 54 is stopped and the VBUS changes to the OFF state. Therefore, communication with the air cleaner 40 is not possible in the power saving mode. In addition, when returning from the power saving mode, the power supply voltage (electric power) is supplied to each functional unit to which supply of the supply voltage (electric power) has been stopped so that predetermined processing (for example, initialization processing) is executed with the return.

On the other hand, the air cleaner 40 according to the present exemplary embodiment includes a controller 60, a communication unit 64, a setting unit 68, and a memory 69. In addition, a function of performing the operation to clean (filter) the air is not shown in FIG. 3.

The controller 60 has a function of performing overall control of the air cleaner 40. In the present exemplary embodiment, the controller 50 has a function of controlling the operation to clean (filter) the air and ON and OFF (operation stop) of a power supply of the air cleaner 40 itself according to the control signal (control command) received from the control device 16 through the communication unit 64. In addition, since the hardware configuration of the controller 60 is substantially the same as the hardware configuration of the controller 50 of the control device 16, its explanation will be omitted.

The setting unit 68 sets the operation of the air cleaner 40 at the time of VBUS OFF according to the control signal (control command) received from the control device 16. In addition, the relationship between the control signal (control command) and the operation of the air cleaner 40 (refer to FIG. 5) is stored in advance in the memory 69, and the controller 60 reads an operation, which corresponds to the control signal (control command) received through the communication unit 64, from the memory 69, and performs the above-described control to execute the operation.

Next, control of the operation (operation in the power saving mode) of the air cleaner 40 by the control device 16 of the multifunctional machine 10 that is the control system according to the present exemplary embodiment will be described in detail. Moreover, in the present exemplary embodiment, the condition for stopping the operation when the air cleaner 40 detects VBUS OFF is set as an initial setting (default) in advance in the setting unit 68 of the air cleaner 40.

Figure 6:
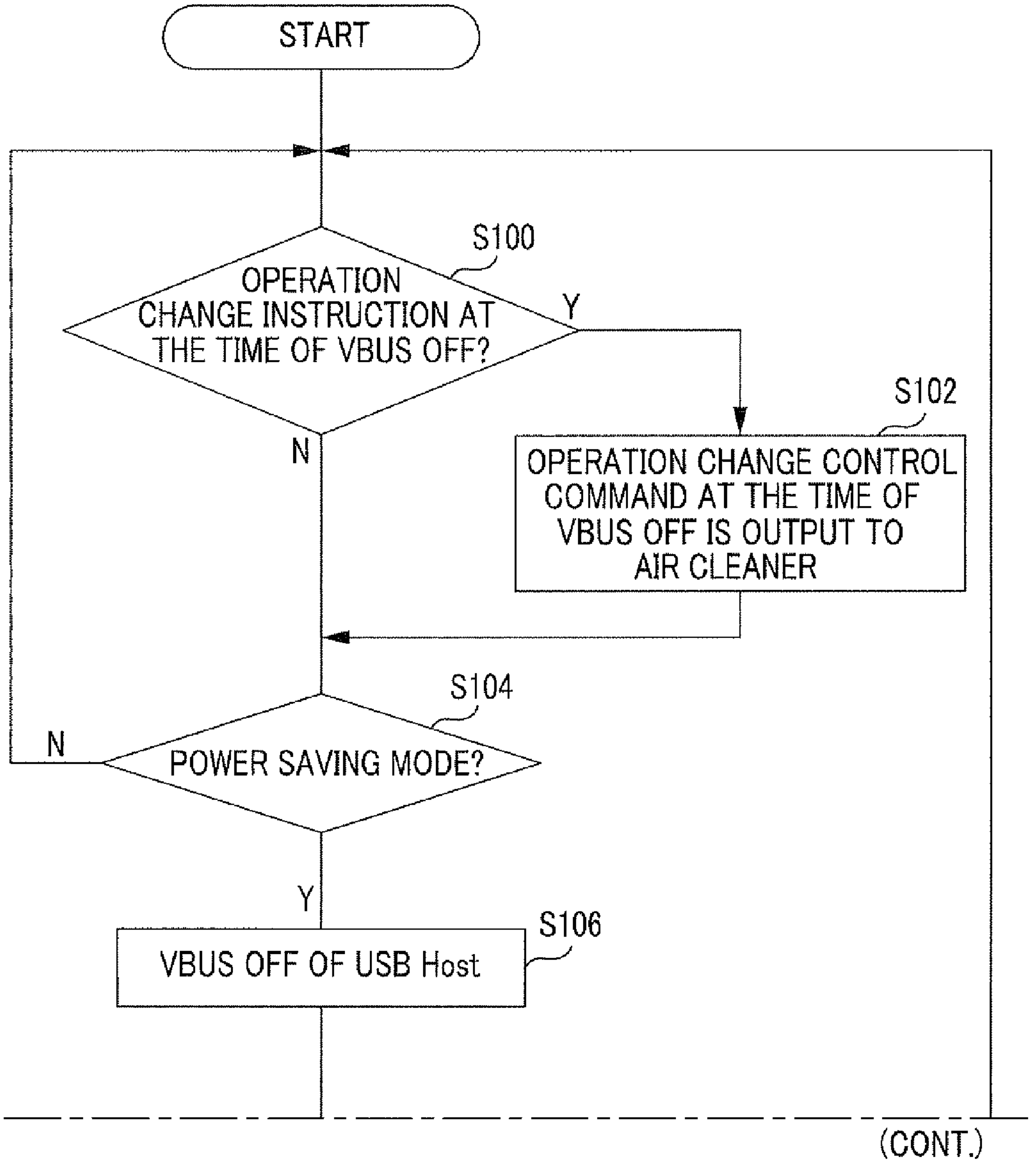
FIG. 6 is a flowchart showing an example of control processing executed by the controller of the control device.

First, control processing executed by the controller 50 of the control device 16 will be described in detail. FIG. 6 shows a flowchart of an example of the control processing executed by the controller 50. The control processing shown in FIG. 6 starts in a normal mode (mode which is not the power saving mode), for example, when electric power is supplied to the multifunctional machine 10.

In step S100, it is determined whether or not an instruction to change the operation of the air cleaner 40 when the VBUS is OFF (VBUS OFF) from the initial setting has been received. When there is no instruction, the process proceeds to step S104.

On the other hand, when the instruction has been received through the display 52, the personal computer 8, or the like, the process proceeds to step S102. In step S102, a predetermined control signal (control command) corresponding to the received operation is output to the air cleaner 40 in order to change the operation at the time of VBUS OFF. Then, the process proceeds to step S104. In addition, there is no particular limitation regarding the format of a control signal (control command), and it is also possible to use a generally used control signal (control command). In the air cleaner 40 that has received the control signal (control command), the operation according to the control command is set in the setting unit 68. In the present exemplary embodiment, as a specific example, "continue the operation of an active air cleaning function when VBUS OFF is detected" is set in the setting unit 68.

In step S104, it is determined whether or not there is mode change to the power saving mode. When there is no mode change to the power saving mode, the process returns to step S100 to repeat the processing in steps S100 to S104. On the other hand, when a control signal for change to the power saving mode is received from the power controller 18 and the mode change to the power saving mode occurs, the process proceeds to step S106.

In step S106, the supply of a power supply voltage (electric power) to the USB Host 54 is stopped. Then, the VBUS becomes OFF, so that communication between the air cleaner 40 and the control device 16 becomes impossible. Thus, when the air cleaner 40 detects VBUS OFF, the operation set in the setting unit 68 is executed in the air cleaner 40 (this will be described in detail later).

Then, in step S108, it is determined whether or not the air cleaner has returned from the power saving mode. When a control signal for returning from the power saving mode is received from the power controller 18 and the air cleaner returns from the power saving mode, the process proceeds to step S110. In step S110, a control signal (control command) to change the VBUS supplied from the USB Host 54 to the air cleaner 40 to the ON state and to perform predetermined return processing (for example, initialization processing) for returning from the power saving mode for the air cleaner 40 is output. Then, the process returns to step S100.

On the other hand, when the air cleaner does not return from the power saving mode in step S108, the process proceeds to step S112. In step S112, it is determined whether or not the main power supply of the multifunctional machine 10 has been turned off. When the main power supply of the multifunctional machine 10 has not been turned off, the process returns to step S108 to repeat the processing in steps S108 to S112. On the other hand, when the main power supply has been turned off, the process proceeds to step S114.

In step S114, the VBUS supplied from the USB Host 54 to the air cleaner 40 changes to the ON state once and then changes to the OFF state again. Then, this processing ends. In the air cleaner 40, therefore, when the main power supply of the multifunctional machine 10 is turned off during the power saving mode, the VBUS OFF state (transition from the ON state to the OFF state) is detected and the operation set in the setting unit 68 is executed (this will be described in detail later).

Figure 7:
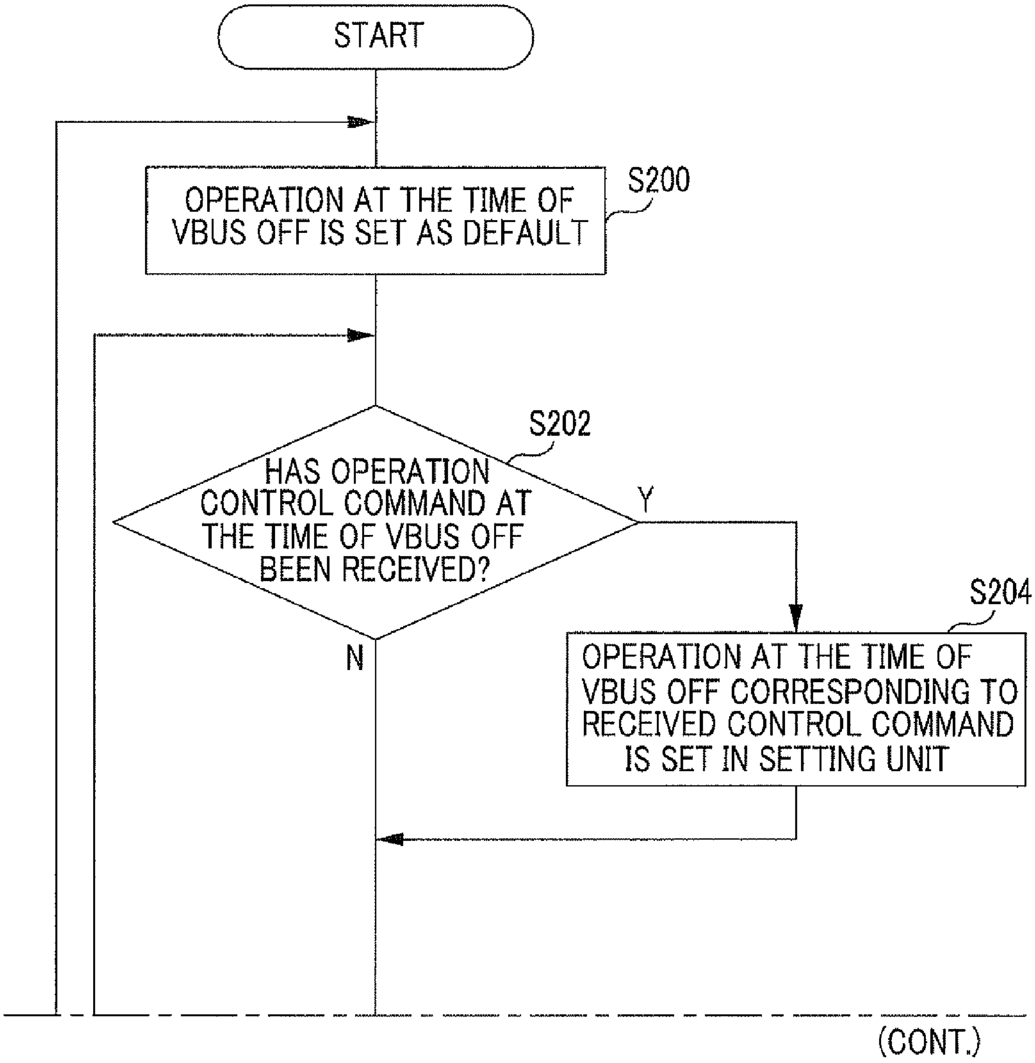
FIG. 7 is a flowchart showing an example of control processing executed by a controller of the air cleaner.

Next, control processing executed by the controller 60 of the air cleaner 40 will be described in detail. FIG. 7 shows a flowchart of an example of the control processing executed by the controller 60. The control processing shown in FIG. 7 starts when the multifunctional machine 10 is in a normal mode (mode which is not the power saving mode), for example, when electric power is supplied to the air cleaner 40.

In step S200, a default (initial setting) operation when VBUS OFF is detected is set in the setting unit 68. In the present exemplary embodiment, as a specific example, "stopping the operation of the air cleaner 40" is set in the setting unit 68 as described above.

Then, in step S202, it is determined whether or not a control signal (control command) for changing the operation at the time of VBUS OFF has been received from the control device 16. When the control signal (control command) has not been received, the process proceeds to step S206. On the other hand, when the control signal (control command) has been received (when the processing of step S102 in the control processing of the control device 16 has been executed), the process proceeds to step S204. In step S204, the controller 60 reads the operation corresponding to the received control signal (control command) from the memory 69 and sets the operation in the setting unit 68. Then, the process proceeds to step S206. In the present exemplary embodiment, as a specific example, "continue the operation of the air cleaner 40 (do not stop operation)" is set in the setting unit 68 as described above.

In step S206, it is determined whether or not VBUS OFF has been detected. When VBUS OFF has not been detected (for example, when the multifunctional machine 10 has not changed to the power saving mode), the process returns to step S202 to repeat the processing in steps S202 to S206. On the other hand, when VBUS OFF has been detected (for example, when step S106 in the control processing of the control device 16 has been executed), the process proceeds to step S208.

In step S208, control to change the operating state is performed according to setting of the operation when VBUS OFF is detected, which is set in the setting unit 68. In the present exemplary embodiment, when a control signal (control command) for changing the operation at the time of VBUS OFF is not received from the control device 16 before the VBUS changes to the OFF state, the operation of the air cleaner 40 (operation for cleaning (filtering) the air; in the present exemplary embodiment, the whole operation of the air cleaner 40) is stopped due to the initial setting (default) in the setting unit 68. On the other hand, when a control signal (control command) for changing the operation at the time of VBUS OFF is received from the control device 16 before the VBUS changes to the OFF state (when "YES" is determined in step S202 and step S204 is executed), the operation of the air cleaner 40 is continued since "do not stop operation of the air cleaner 40 even if VBUS OFF is detected" is set in the setting unit 68.

Then, in step S210, it is determined whether to stop the operation of the air cleaner 40 (whether to turn off the main power supply of the air cleaner 40). When the operation of the air cleaner 40 is stopped, for example, when the initial setting (default) is set in the setting unit 68, this processing ends. On the other hand, when the operation of the air cleaner 40 is continued, the process returns to step S200 to repeat this processing.

Here, the case where the multifunctional machine 10 changes to the power saving mode and the operation of the air cleaner 40 continues will be described. In this case, in the air cleaner 40, "No" is determined in step S210, and the process returns to step S200 to return to the state where the initial setting (default) is set in the setting unit 68. Since the multifunctional machine 10 is in the power saving mode, a control signal (control command) is not received from the control device 16. Accordingly, "NO" is determined in step S202, and the process proceeds to step S206. When the multifunctional machine 10 is in the power saving mode and when the multifunctional machine 10 returns from the power saving mode, "NO" is determined in step S206. Moreover, in the power saving mode, the VBUS supplied from the USB Host 54 of the control device 16 is still in the OFF state, but VBUS OFF has not been newly detected (transition from the VBUS ON state to the VBUS OFF state has not been detected). In the present exemplary embodiment, therefore, "NO" is determined in step S206 as described above. When "NO" is determined in step S206, the process returns to step S202 as described above to repeat the processing in steps S202 to S206.

On the other hand, when the main power supply of the multifunctional machine 10 is turned off during the power saving mode, step S114 in the control processing of the control device 16 is executed. Accordingly, since the VBUS OFF state is detected (transition from the VBUS ON state to the VBUS OFF state is detected), "YES" is determined in step S206. Then, the process proceeds to step S208.

In step S208, since control to change the operation is performed according to the initial setting (default), the operation of the air cleaner 40 is stopped. Then, in step S210, "YES" is determined, and this processing ends.

As described above, in the control system 1 including the control device 16 of the multifunctional machine 10 and the air cleaner 40 according to the present exemplary embodiment, the operation at the time of VBUS OFF supplied from the control device 16 is set in advance in the setting unit 68 of the air cleaner 40. When there is an instruction to change the operation at the time of VBUS OFF from the control device 16, a control signal (control command) for instructing the change of the operation at the time of VBUS OFF is output from the USB Host 54 of the control device 16 to the air cleaner 40. In the air cleaner 40, the controller 60 reads an operation according to the control signal, which has been received through the communication unit 64, from the memory 69 and sets it in the setting unit 68.

Through such setting, even when the multifunctional machine 10 changes to the power saving mode and communication between the control device 16 and the air cleaner 40 is not possible, the VBUS change from the ON state to the OFF state is detected due to the change to the power saving mode. Therefore, in the air cleaner 40, it is possible to execute the operation set in the setting unit 68 by the instruction of the control device 16. For example, in the present exemplary embodiment, it is possible to continue the operation to clean (filter) the air and also to stop the operation when the initial setting (default) is set in the setting unit 68.

In addition, in the present exemplary embodiment, when the main power supply of the multifunctional machine 10 is turned off during the power saving mode, the control device 16 changes the VBUS supplied from the USB Host 54 to the ON state once and then changes it to the OFF state again. Thus, by changing the ON and OFF states of the VBUS supplied from the USB Host 54, the "VBUS has changed from the ON state to the OFF state again" is detected in the air cleaner 40. Therefore, in the air cleaner 40, it is possible to execute the operation set in the setting unit 68 by the instruction of the control device 16. For example, in the present exemplary embodiment, it is possible to stop the operation of the air cleaner 40 since the initial setting (default) is set again in the setting unit 68 during the power saving mode. That is, it is possible to stop the operation of the air cleaner 40 (turn off the power supply) when the main power supply of the multifunctional machine 10 is turned off during the power saving mode.

Since USB communication between the control device 16 and the air cleaner 40 is not possible in the power saving mode, it is not possible for the control device 16 to control the operation of the air cleaner 40. For this reason, when controlling an air cleaner through a control device in a general system, the control device should supply electric power to the USB Host once to execute an initialization procedure and then output a control signal to the air cleaner. In this case, the processing becomes complicated.

On the other hand, in the control system 1 including the control device 16 and the air cleaner 40 according to the present exemplary embodiment of the invention, the operation of the air cleaner 40 is controlled even in the power saving mode, with "detection of transition from the VBUS ON state to the VBUS OFF state" as a trigger, by the instruction from the control device 16.

Therefore, even if the air cleaner 40 is in a state where a control signal (control command) from the control device 16 is not received, the execution of the operation of the air cleaner 40 may be controlled.

In the present exemplary embodiment, for the operation when the VBUS OFF state is detected in the air cleaner 40, the case of continuing the operation of the air cleaner 40 has been described in detail. However, the invention is not limited to this. For example, it is possible to stop an operation to change the air volume (for example, an operation for switching to a weak operation mode in order to make the air volume less than normal), or it is possible to set the timer (not shown) and stop the operation of the air cleaner 40 after a predetermined time.

In addition, although the case where the control device 16 of the multifunctional machine 10 is applied as the control device according to the present exemplary embodiment of the invention has been described in the present exemplary embodiment, the invention is not limited to this. For example, the multifunctional machine 10 is not limited to having a document reading function (document reader 12) and an image forming function (image forming apparatus 14), and may further have other functions, such as a facsimile function. In addition, the invention may also be applied to the control device 16 of an apparatus (for example, the image forming apparatus 14) with a single function without being limited to the multifunctional machine 10. In addition, the invention may be applied to control devices of other image processing apparatuses, or may be applied to control devices of a personal computer and the like. The invention may be applied to any control device without particular limitation if it is a control device of an external apparatus that controls a device.

In addition, although the case where the air cleaner 40 is applied as the device according to the present exemplary embodiment of the invention has been described in the present exemplary embodiment, the invention is not limited to this. The invention may be applied to any device if its operation is controlled by the control device (control device 16) according to the present exemplary embodiment of the invention and a supply voltage (VBUS) is supplied from the control device to the device through a power line.

In addition, although the case where the control device 16 and the air cleaner 40 communicate with each other by USB communication has been described in the present exemplary embodiment, the invention is not limited to this. For example, there is no limitation if a communication unit including a signal line (communication line) through which a control signal is output, such as IEEE1394 (Fire Wire) or ThunderBolt, and a power line for supplying a supply voltage is used.

In addition, the configuration, operations, control processing, and the like of the multifunctional machine 10, the control device 16, and the air cleaner 40 described in the present exemplary embodiment are just examples, and it is needless to say that they may be modified within the technical scope of the invention according to the situation.

The foregoing description of the exemplary embodiments of the invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention is defined by the following claims and their equivalents.

What is claimed is:

1. A device comprising:

a first receiving unit that receives a supply voltage supplied from a control device;

a second receiving unit that receives from the control device a control signal for executing a predetermined operation in each functional unit;

a setting unit that sets the predetermined operation in a setting section when the second receiving unit receives the control signal indicating the predetermined operation to be executed in each functional unit when the supply voltage is in an OFF state; and a controller that performs control to execute the predetermined operation, which is set in the setting unit, in each functional unit when the supply voltage received by the first receiving unit is in an OFF state and the second receiving unit does not receive the control signal from the control device.

2. A control device comprising:

a first output unit that outputs a supply voltage to a device;

a second output unit that outputs a control signal for executing a predetermined operation in the device; and a controller that controls ON and OFF states of the supply voltage output from the first output unit on the basis of a predetermined condition and controls the second output unit to output a control signal indicating the predetermined operation to be executed in the device when the supply voltage is in an OFF state and the second output unit does not output the control signal for executing the predetermined operation in the device.

3. The control device according to claim 2, wherein the controller performs control such that the first output unit outputs the supply voltage in an OFF state when the predetermined condition indicates a power saving mode.

4. The control device according to claim 3, wherein the controller performs control such that the first output unit outputs the supply voltage, which changes to an OFF state after an ON state, when the predetermined condition indicates that a main power supply is turned off during the power saving mode.

5. A control system comprising:

the control device according to claim 2; and the device according to claim 1 controlled by the supply voltage and the control signal output from the control device.

6. A non-transitory computer readable medium that stores a control program causing a computer to function as:

the setting unit and the controller of the device according to claim 1.

7. A non-transitory computer readable medium that stores a control program causing a computer to function as:

the controller of the control device according to claim 2.

* * * * *